US009567077B2

(12) United States Patent
Mullan et al.

(10) Patent No.: US 9,567,077 B2
(45) Date of Patent: Feb. 14, 2017

(54) UNMANNED VEHICLE (UV) CONTROL SYSTEM

(71) Applicant: ACCENTURE GLOBAL SERVICES LIMITED, Dublin (IE)

(72) Inventors: Pramila Mullan, Los Gatos, CA (US); Walid Negm, Reston, VA (US); Edy S. Liongosari, San Francisco, CA (US); Paul Barsamian, Glenview, IL (US); Brian Richards, Chicago, IL (US); Sang-Ik Kim, Toronto (CA); Michael Mui, San Francisco, CA (US); Robert Fenney, San Francisco, CA (US)

(73) Assignee: ACCENTURE GLOBAL SERVICES LIMITED, Dublin (IE)

( * ) Notice: Subject to any disclaimer, the term of this patent is extended or adjusted under 35 U.S.C. 154(b) by 0 days.

(21) Appl. No.: 14/619,854

(22) Filed: Feb. 11, 2015

(65) Prior Publication Data
US 2015/0234387 A1 Aug. 20, 2015

Related U.S. Application Data

(60) Provisional application No. 61/940,251, filed on Feb. 14, 2014, provisional application No. 61/943,224, filed on Feb. 21, 2014.

(51) Int. Cl.
G05D 1/02 (2006.01)
B64C 39/02 (2006.01)
(Continued)

(52) U.S. Cl.
CPC ........... *B64C 39/024* (2013.01); *G05D 1/0088* (2013.01); *G05D 1/104* (2013.01); *B64C 2201/127* (2013.01); *B64C 2201/141* (2013.01)

(58) Field of Classification Search
CPC ..... G05D 1/0038; G05D 1/0088; G05D 1/104
(Continued)

(56) References Cited

U.S. PATENT DOCUMENTS 6,122,572 A * 9/2000 Yavnai ................. G05D 1/0088
342/13
7,912,633 B1 * 3/2011 Dietsch ................. G01C 21/20
701/450
(Continued)

FOREIGN PATENT DOCUMENTS

EP   2333479   6/2011

OTHER PUBLICATIONS

Axel BA 1/4 RKLE et al., "Towards Autonomous Micro UAV Swarms," Journal of Intelligent and Robotic Systems; Theory and Applications—(Incorporating Mechatronic Systems Engineering), Kluwer Academic Publishers, DO, vol. 61, No. 1-4, Oct. 27, 2010, pp. 339-353.

(Continued)

*Primary Examiner* — Thomas G Black
*Assistant Examiner* — Wae Louie
(74) *Attorney, Agent, or Firm* — Mannava & Kang, P.C.

(57) ABSTRACT

Unmanned vehicle (UV) control may include receiving a UV work order and generating a mission request based on the UV work order. The mission request may identify an objective of a mission, assign a UV and a sensor to the mission from a fleet of UVs and sensors, and assign a first movement plan to the mission based on the identified objective of the mission. The assigned UV may be controlled according to the assigned first movement plan, and communication data may be received from the assigned sensor. The communication data may be analyzed to identify an event related to the mission. The identified event and the first movement plan may be analyzed to assign a second (Continued)

movement plan to the mission based on the analysis of the identified event and the first movement plan to meet the identified objective of the mission.

20 Claims, 13 Drawing Sheets

(51) Int. Cl.
*G05D 1/10* (2006.01)
*G05D 1/00* (2006.01)

(58) Field of Classification Search
USPC ............. 701/2, 3, 23, 450; 342/13, 16
See application file for complete search history.

(56) References Cited

U.S. PATENT DOCUMENTS

| 8,670,747 | B1 | 3/2014 | Muller et al. | |
| 2006/0184292 | A1* | 8/2006 | Appleby | F41H 13/00 701/23 |
| 2007/0021880 | A1* | 1/2007 | Appleby | G05D 1/104 701/23 |
| 2009/0222148 | A1* | 9/2009 | Knotts | G05D 1/0038 701/2 |
| 2011/0019558 | A1* | 1/2011 | Rowe | H04L 43/0858 370/252 |
| 2011/0186687 | A1* | 8/2011 | Elder | B64C 31/06 244/155 A |
| 2014/0316616 | A1* | 10/2014 | Kugelmass | G05D 1/101 701/8 |
| 2015/0234387 | A1* | 8/2015 | Mullan | G05D 1/104 701/3 |

OTHER PUBLICATIONS

European Patent Office, "The Extended European search report" European Patent Application No. 15154833.6, dated Jun. 19, 2015, 9 pages.

European Patent Office, "The Extended European search report" European Patent Application No. 15154892.2, dated Jun. 19, 2015, 8 pages.

Pignaton De Freitas, Edison et al., 'UAV Relay Network to Support WSN Connectivity', 2010 International Congress on Ultra Modern Telecommunications and Control Systems and Workshops (ICUMT), 2010, 6 pages.

* cited by examiner

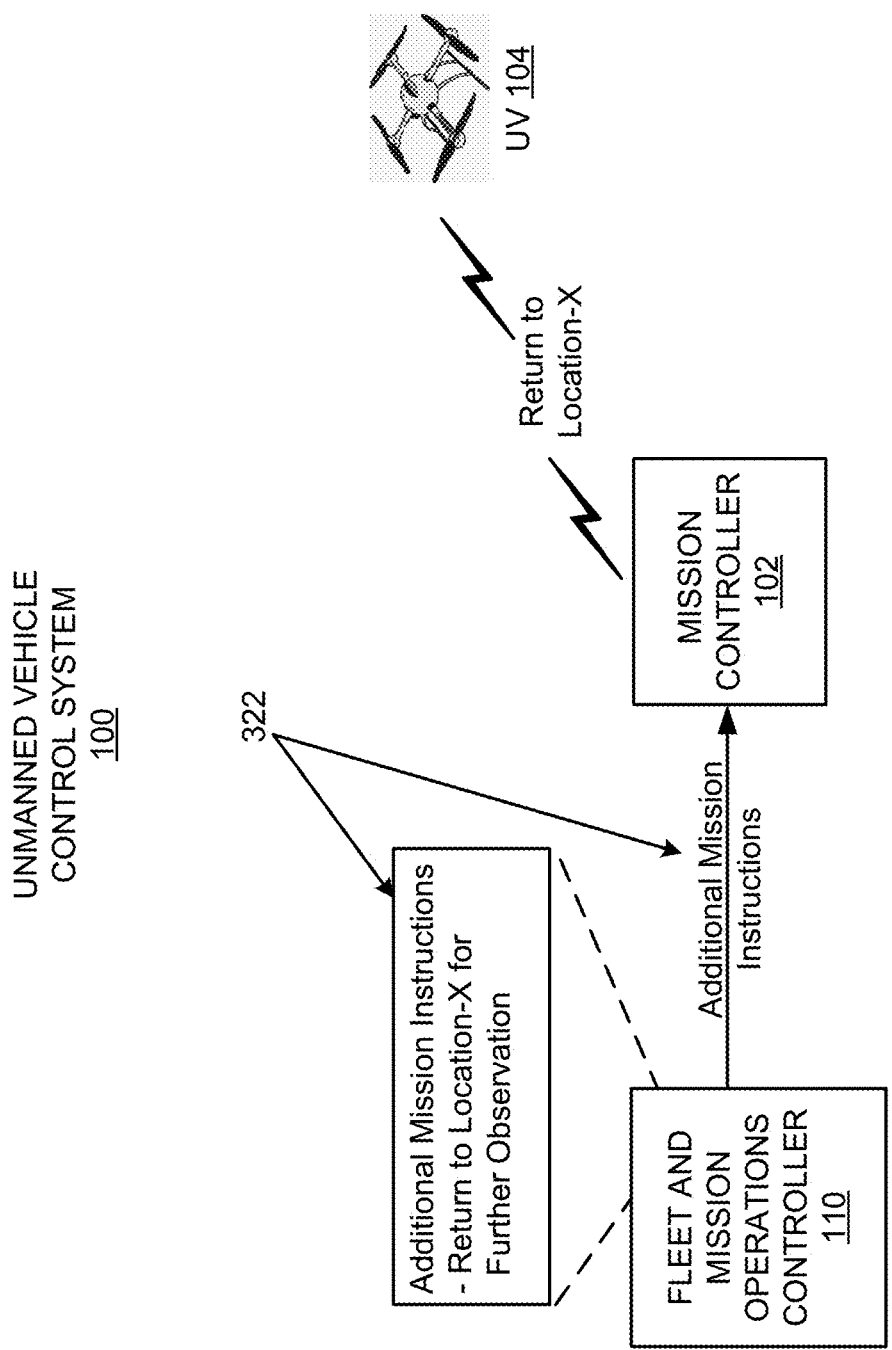

UNMANNED VEHICLE (UV) CONTROL SYSTEM

CROSS-REFERENCE TO RELATED APPLICATION(S)

This application claims priority to U.S. provisional patent application Ser. No. 61/940,251, filed Feb. 14, 2014, entitled "Unmanned Business Operations Platform", U.S. provisional patent application Ser. No. 61/943,224, filed Feb. 21, 2014, entitled "Unmanned Business Operations Platform", and further relates to commonly assigned and co-pending U.S. non-provisional patent application Ser. No. 14/619,749, entitled "Unmanned Vehicle (UV) Movement and Data Control System", filed on Feb. 11, 2015, which are incorporated by reference in their entirety.

BACKGROUND

Unmanned vehicles (UVs) such as aerial vehicles (e.g., Unmanned aerial vehicles (UAVs), or drones), land vehicles, or even collaborative robots are typically operated without a human aboard. UVs may include three types of platforms based on their ability to control their operation. For example, UVs may be categorized as remote controlled (RC), task following, and semi to fully autonomous.

RC platform based UVs typically do not include the capability to control the UV behavior, and rely on an external operator to perform tasks. For example, a RC platform based UV may be instructed by an operator who has a line-of-sight to the UV to implement every behavior change, and to guide the UV through each task that is to be performed.

A task following platform based UV may include the ability to receive instructions on how to perform a task, and then repeat the task until receiving instructions to stop performing the task, or based on the occurrence of an exception that the UV has been preprogrammed to respond to. An operator for a task following platform based UV may monitor the status of the UV, and then report the results of the task following platform based UV's execution. Task following platform based UVs may be operated without a line-of-sight to the UV, even when the UV is being manually controlled by an operator. For example, a video camera mounted on the UV and a wireless video link (e.g., a "first-person-view", or FPV) may allow an operator to control the UV without line of site.

A semi or fully autonomous platform (e.g., "smart platform") based UV may receive instructions related to a task. Based on access to real-time sensor data on the UV and a set of objectives that are specified by the instructions, the semi or fully autonomous platform based UV may be deployed to follow the instructions.

BRIEF DESCRIPTION OF DRAWINGS

Features of the present disclosure are illustrated by way of examples shown in the following figures. In the following figures, like numerals indicate like elements, in which:

FIGS. 3A-3C illustrate an environment for operation of the UV control system of FIG. 1, according to an example of the present disclosure;

DETAILED DESCRIPTION

Figure 1:
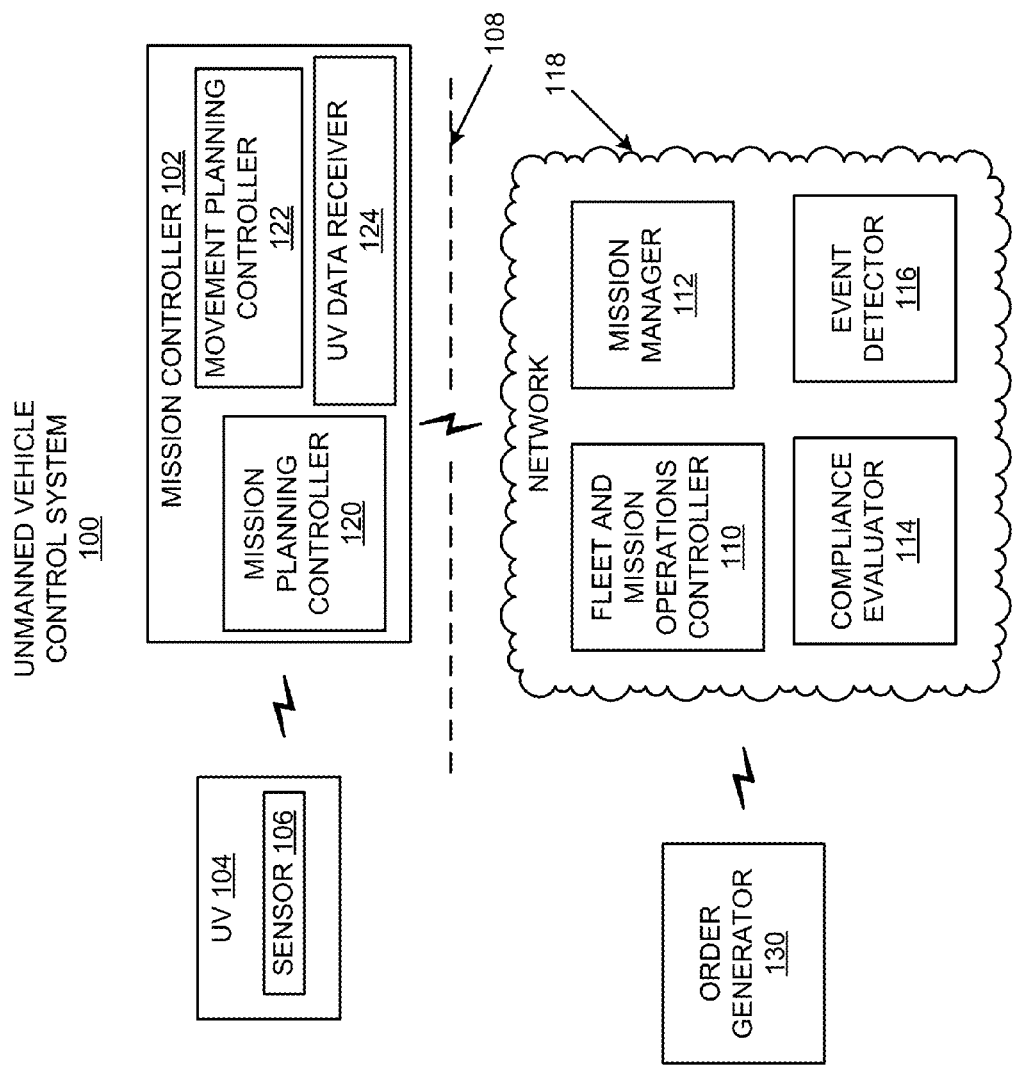
FIG. 1 illustrates a detailed architecture of a UV control system, according to an example of the present disclosure.

For simplicity and illustrative purposes, the present disclosure is described by referring mainly to examples thereof. In the following description, numerous specific details are set forth in order to provide a thorough understanding of the present disclosure. It will be readily apparent however, that the present disclosure may be practiced without limitation to these specific details. In other instances, some methods and structures have not been described in detail so as not to unnecessarily obscure the present disclosure.

Throughout the present disclosure, the terms "a" and "an" are intended to denote at least one of a particular element. As used herein, the term "includes" means includes but not limited to, the term "including" means including but not limited to. The term "based on" means based at least in part on.

Unmanned vehicles (UVs) such as aerial vehicles (e.g., Unmanned aerial vehicles (UAVs), or drones), land vehicles, or even collaborative robots are typically operated without a human aboard. With improvements in sensors, data analytics capabilities, and programmatic mechanization components, UVs may be used in a variety of ambiguous environments, and for performance of a variety of ambiguous tasks. For example, UVs may be used for package delivery, agriculture, emergency services, pipeline inspection, etc. However, integration of UVs in a workflow involving such areas is limited.

According to examples, a UV control system and a method for UV control are disclosed herein. The system and method disclosed herein may generally utilize a hardware implemented mission manager and a hardware implemented event detector to assign and manage a mission upon receipt of a work order. The mission manager may maintain knowledge of a fleet of UVs, sensors, and crew, as well as information regarding work order status, and mission status. A hardware implemented fleet and mission operations controller may operate in conjunction with the mission manager to translate the work order into a mission request by assigning UVs, sensors, and crew to the mission request, identifying a movement plan, and an objective for the mission. Once the mission is launched, the event detector may analyze communication data received during the mission, and generate alarms to the mission manager when events that may result in potential problems are detected. The fleet and mission operations controller may operate in conjunction with the mission manager to modify the UV movement plan, and adjust, in real-time, movement plans of the UV based on the events.

With respect to the mission manager that tracks information regarding UVs, sensors, and UV operation crew, UVs may be tracked, for example, by type, availability, and ability to mount particular sensors. The mission manager may also track sensors by type, availability, and ability to be mounted on particular UVs. UV operation crews may also be tracked by availability and ability to operate particular UVs.

The fleet and mission operations controller may receive a work order related to UV mission. According to an example, work orders may be received from various enterprises and cover a variety of applications of UVs. The fleet and mission operations controller may operate in conjunction with the mission manager to translate a work order into a mission request. A mission request may identify, for example, an operation for a UV, a type of a UV to complete the operation, at least one type of sensor to be mounted on the UV, a UV operation crew, a movement plan, and/or an objective for the mission. For example, a mission request may indicate that a fixed wing UAV or quadcopter (i.e., types of UAVs) may be equipped with a video camera, a gas detector, an infrared (IR) camera, and/or a pressure sensor to detect leaks in an oil pipeline.

After launching the mission, the UV may follow the movement plan autonomously, or with varying degrees of remote operator guidance from a hardware implemented movement planning controller operated by an operations crew. Sensors mounted onto the UV may transmit data in real-time to a ground station on the field, such as a portable device with a hardware implemented UV data receiver, and the ground station may transmit the data to the event detector, which may be disposed off-site. The event detector may process the data to identify an event. When an event is identified, the event detector may transmit an alarm to the fleet and mission operations controller for further review by a mission operator. The alarm may include information such as an identification of the event, data associated with the event, a location of the event, etc. After reviewing the event, the mission manager may operate in conjunction with the fleet and mission operations controller to generate instructions in real-time with an updated movement plan for a UV operator.

The system and method disclosed herein may be used in a variety of environments and for a variety of purposes. For example, the system and method disclosed herein may be used to monitor a pipeline in the oil and gas industry. In the oil and gas industry, the system and method disclosed herein may be used in other scenarios, including other types of exploration (e.g., site survey, site drilling, etc.), development (e.g., pad placement, facility rendering, capital project, surveillance, etc.), production (e.g., flare/vent inspection, oil sheen detection, disaster prevention, etc.), manufacturing (flute/chimney inspection, tank/gas inspection, gas detection, etc.), and transportation (e.g., right of way monitoring, theft monitoring, etc.).

The system and method disclosed herein may be used in package delivery (e.g., food, medicine, equipment, etc.), aerial surveillance (e.g., police/fire department, cartography, photography, film, journalism, real estate, etc.), exploration (e.g., mine detection, site survey, etc.), research (e.g., wildlife, atmosphere, ocean, etc.), remote sensing (e.g., telecommunications, weather, maritime, construction, etc.), disaster relief (e.g., survivors, explore contaminated areas, etc.), environment (e.g., forest fires, threats, etc.), and agriculture (e.g., spray pesticides, crop growth, disease, irrigation level, wild animals, etc.).

The system and method disclosed herein may be used for scheduling of predictive maintenance to provide asset inspection, diagnostics, repair, and maintenance work. Further, the system and method disclosed herein may be used, for example, to identify and schedule environmental (e.g., terrain, vegetation, etc.) management. The system and method disclosed herein may also provide for enhancements in safety and environmental protection related to the various activities described herein. For example, with respect to the oil and gas industry, the system and method disclosed herein may be used to protect assets from sabotage, illegal tapping, and terrorist actions in an efficient and economical manner.

The system and method disclosed herein may be used to analyze data from a UV to determine tasks that may be both electronically and mechanically automated in a workflow, and to identify insights that may be obtained from the data. These insights may be used to drive operational decisions, such as shortening lead time to problem detection, or predictive maintenance with pipelines, for example, in the oil and gas industry. The system and method disclosed herein may provide for the reduction of exposure to hazardous environments, increase efficiency and effectiveness with respect to UV control, and optimize operations.

Generally, the system and method disclosed herein may be envisioned in a broad range of applications where drones or UVs may be used to reduce cost, increase safety, and increase productivity.

The system and method disclosed herein may account for aspects related to the state of UV technology, regulation and compliance, readiness, and safety and privacy. With respect to UV technology, the system and method disclosed herein may provide the hardware and software platform and setup for UV control. The system and method disclosed herein may also provide for implementation of aspects such as optimal movement planning operations and life cycle management, selection of specialized sensors, direct data transmission from a UV, UV infrastructure and availability management, task distribution among multiple UVs, and reprioritization of UV objectives. With respect to security, safety, and regulations, the system and method disclosed herein may provide for constraints based on local regulations and certification, UV certification and operator training, requirements regarding reporting of incidents to authorities, obstacle avoidance, authentication and authorization of missions, ensuring that a mission has not been compromised or sabotaged, and protection against misuse. The system and method disclosed herein may also provide for secure transmission of data from the event detector that may be implemented in a cloud environment, end-to-end process integration, analytics requirements based on vertical industry, data storage and security, defining business rules, and redefining workflows to incorporate use of the UVs and availability of new insights into related processes.

For the system and method disclosed herein, a hardware implemented order generator may generate and/or submit work orders to the fleet and mission operations controller. The hardware implemented order generator may execute machine readable instructions to generate and/or submit the work orders, and/or be implemented to include and/or utilize a cloud based service to generate and/or submit the work orders.

For the system and method disclosed herein, the fleet and mission operations controller may perform various tasks, such as, specification of mission objectives and routes, scheduling of missions, assignment of a mission operator and assistant, assignment of UV equipment, monitoring of missions in progress, making adjustments to mission requirements. Further, the fleet and mission operations controller may operate in conjunction with the mission manager to generate a mission request from a work order.

For the system and method disclosed herein, the movement planning controller may plan and execute a mission. Further, the movement planning controller may monitor the FPV to ensure that mission objectives are being met, and adjust mission routes as needed.

For the system and method disclosed herein, a hardware implemented mission planning controller may manage, for example, a camera gimbal and a video camera, and monitor video capture to ensure quality.

According to examples disclosed herein, the UV control system may include the hardware implemented fleet and mission operations controller that is executed by at least one hardware processor to receive a UV work order and to generate a mission request based on the UV work order. According to an example, the mission request may include an identification of an objective of a mission, an assignment of a UV and a sensor to the mission from a fleet of UVs and sensors, and an assignment of a first movement plan to the mission based on the identified objective of the mission.

According to an example, the hardware implemented mission controller that is executed by the at least one hardware processor may control the assigned UV according to the assigned first movement plan, and receive communication data from the assigned sensor.

According to an example, the hardware implemented event detector that is executed by the at least one hardware processor may analyze the communication data to identify an event related to the mission, and forward the identified event to the hardware implemented fleet and mission operations controller. The mission operations controller may analyze the identified event and the first movement plan, and assign a second movement plan to the mission based on the analysis of the identified event and the first movement plan to meet the identified objective of the mission. The second movement plan may be different than the first movement plan. The hardware implemented mission controller may control the assigned UV according to the assigned second movement plan. According to an example, the first movement plan may include predefined way points and alternate points for the UV based on the identified objective of the mission, and the second movement plan may include one or more different predefined way points from the predefined way points and one or more different alternate points from the alternate points for the UV based on the analysis of the identified event to meet the identified objective of the mission.

According to an example, a hardware implemented compliance evaluator that is executed by the at least one hardware processor may determine whether the mission request is compliant with regulations. In response to a determination that the mission request is compliant with regulations, the hardware implemented compliance evaluator may forward the mission request to the hardware implemented mission controller. For example, the hardware implemented compliance evaluator may determine whether the assigned UV and a UV operation crew associated with the mission request is compliant with regulations. The hardware implemented compliance evaluator may also determine, on a continuous or semi-continuous basis, whether additional in-flight changes to a mission, based on sensor requests, deviate from the mission request.

According to an example, the sensor may include a video camera, and the hardware implemented mission controller may generate a real-time display from the video camera, receive instructions to modify movement of the UV based on an analysis of the real-time display from the video camera, and modify movement of the UV based on the received instructions.

According to an example, the hardware implemented event detector may analyze the communication data to identify the event that includes a potential leak or an intruder related to a pipeline.

According to an example, the hardware implemented event detector may analyze the communication data to identify the event related to a pipeline, and generate instructions for preventative actions with respect to the pipeline based on the identification of the event.

According to an example, the hardware implemented mission controller may generate a real-time display related to the event, where the real-time display includes a characterization of a type and a severity level of the event.

The UV control system and the method for UV control disclosed herein provide a technical solution to technical problems related, for example, to UV control. The system and method disclosed herein provide the technical solution of the hardware implemented fleet and mission operations controller that is executed by at least one hardware processor to receive a UV work order and to generate a mission request based on the UV work order. The mission request may include an identification of an objective of a mission, an assignment of a UV and a sensor to the mission from a fleet of UVs and sensors, and an assignment of a first movement plan to the mission based on the identified objective of the mission. According to an example, the hardware implemented mission controller that is executed by the at least one hardware processor may control the assigned UV according to the assigned first movement plan, and receive communication data from the assigned sensor. According to an example, the hardware implemented event detector that is executed by the at least one hardware processor may analyze the communication data to identify an event related to the mission, and forward the identified event to the hardware implemented fleet and mission operations controller. The mission operations controller may analyze the identified event and the first movement plan, and assign a second movement plan to the mission based on the analysis of the identified event and the first movement plan to meet the identified objective of the mission. The second movement plan may be different than the first movement plan. The hardware implemented mission controller may control the assigned UV according to the assigned second movement plan. According to an example, a hardware implemented compliance evaluator that is executed by the at least one hardware processor may determine whether the mission request is compliant with regulations. In response to a determination that the mission request is compliant with regulations, the hardware implemented compliance evaluator may forward the mission request to the hardware implemented mission controller. For example, the hardware implemented compliance evaluator may determine whether the assigned UV and a UV operation crew associated with the mission request is compliant with regulations.

The hardware implemented components described herein with respect to the system and method disclosed herein may execute machine readable instructions, and/or be implemented to provide and/or utilize a cloud based service.

FIG. 1 illustrates a detailed architecture of a UV control system 100, according to an example of the present disclosure. The UV control system 100 may include a hardware implemented mission controller 102 that is to perform various operations related, for example, to mission planning, movement planning, and receiving of data from a UV 104. The UV 104 may include a plurality of UVs. The UV 104 may include a sensor 106. The sensor 106 may include a plurality of sensors. The UV 104 may encompass all types of UVs, including a variety of aerial, land, space, and marine UVs. The UV 104 may take off (e.g., for an aerial UV), navigate, capture data, transmit collected data, return, and land without human interaction.

The sensor 106 may gather data associated with a mission. The sensor 106 may include a variety of types of sensors that may be categorized as sight sensors, sound sensors, touch sensors, smell sensors, position sensors, external communication sensors, proximity sensors, and other (e.g., miscellaneous sensors). The sight sensors may include sensors for ascertaining light intensity, color, distance (e.g., by infrared (IR), measuring angle of light bounce), video capture, rotation (e.g., optical encoders), and/or light signal read (e.g., infrared codes). The sound sensors may include sensors (e.g., a microphone) for ascertaining volume (e.g., decibel meter), frequency measurement, and/or distance (e.g., sonar, measuring time to echo). The touch sensors may include sensors for ascertaining position awareness (e.g., collision alert, contact confirmation, etc.), bend/strain, temperature, and/or pressure (e.g., barometric, grip strength, etc.). The smell sensors may include sensors such as gas sensors, alcohol sensors, etc. The position sensors may include sensors (e.g., accelerometer, digital compass, gyroscope) for ascertaining location (e.g., based on global positioning system (GPS), proximity to a beacon, etc.), and/or tilt. The external communication sensors may include sensors for ascertaining radio communication, and/or IR codes. The proximity sensors may include sensors to ascertain nearness in space, time, and/or relationship. The miscellaneous sensors may include sensors for ascertaining date and time (e.g., ultra-low frequency (ULF) updates), network communication status, and/or voltage (e.g., low fuel, low battery).

The UV 104 may also include various components for processing, and generating outputs. For example, with respect to processing, the UV 104 may provide for sensor data processing for analog and digital input/output (I/O), kinematics (e.g., position and orientation of objects), proportional-integral-derivative (PID) feedback control, rules application (e.g., if this, do that), navigation (e.g., move to a waypoint), mission execution (e.g., manage multiple waypoints), telemetry management (e.g., summarizing telemetry data), counter, audio/voice processing (e.g., speech to text, text to speech), manage date/time, and data management (e.g., memory, disk, etc.). With respect to processing, the UV 104 may provide for outputs such as movement, motors (e.g., servos, stepper, brushless), hydraulics, pneumatics, gravity release, visual indicators/feedback, LEDs, LCDs, displays, audio indicators/feedback, speaker, buzzer, etc., voltage change (e.g., not in use, go to low power mode), and external communication subsystems (e.g., radio, IR codes).

In the example of FIG. 1, the UV 104 and the mission controller 102 may be disposed in a field (e.g., above dashed line 108), whereas the fleet and mission operations controller 110, the mission manager 112, the compliance evaluator 114, and the event detector 116 may be hosted in an off-site facility (e.g., below the dashed line 108), such as a cloud environment 118. In some examples, the cloud environment 118 may be a data center or another distributed network capable of processing relatively large amounts of data in real time. In other examples, the components of the UV control system 100 that are located in an off-site facility may be based, for example, on the hardware capabilities of chips installed on the UV 104, a size and power associated with the UV 104, and processing requirements of a mission executed by the UV 104.

The mission planning controller 120 may enable the UV 104 to be programmed to run autonomously. The UV 104 may be equipped with the sensor 106 and intelligence to maintain altitude and a stabilized flight (e.g., for an aerial UV). The sensor 106 may be used to determine the position and altitude of the UV 104 at any given point in time. This enables the UV 104 to navigate between two points according to pre-defined waypoints, without any human interaction during the flight (e.g., for an aerial UV). The mission planning controller 120 may generate a display of the mission details that may be viewed by a UV operation crew (e.g., a pilot and/or assistant).

The movement planning controller 122 may be used to launch the UV 104, and control the UV flight path (e.g., for an aerial UV) and associated sensors. Once the UV 104 begins its movement plan from the launch point, the mission planning controller 120 may communicate with the mission manager 112 to indicate the beginning of the mission. According to an example, the mission controller 102 may be stored on a tablet or another portable device.

A hardware implemented UV data receiver 124 may be used to receive various types of communication data from the UV 104. The communication data may be used, for example, by the event detector 116 to determine events related to an objective of the mission.

The fleet and mission operations controller 110 may receive a work order from the order generator 130. The work order may identify a problem detected, for example, at a particular location or region of a pipeline that requires further exploration. The mission manager 112 may maintain information regarding UVs and sensors in inventory. For example, the mission manager 112 may track UVs by type, availability, and an ability to mount particular sensors. The mission manager 112 may also track sensors by type, availability, and ability to be mounted on a particular UV.

Figure 3A:
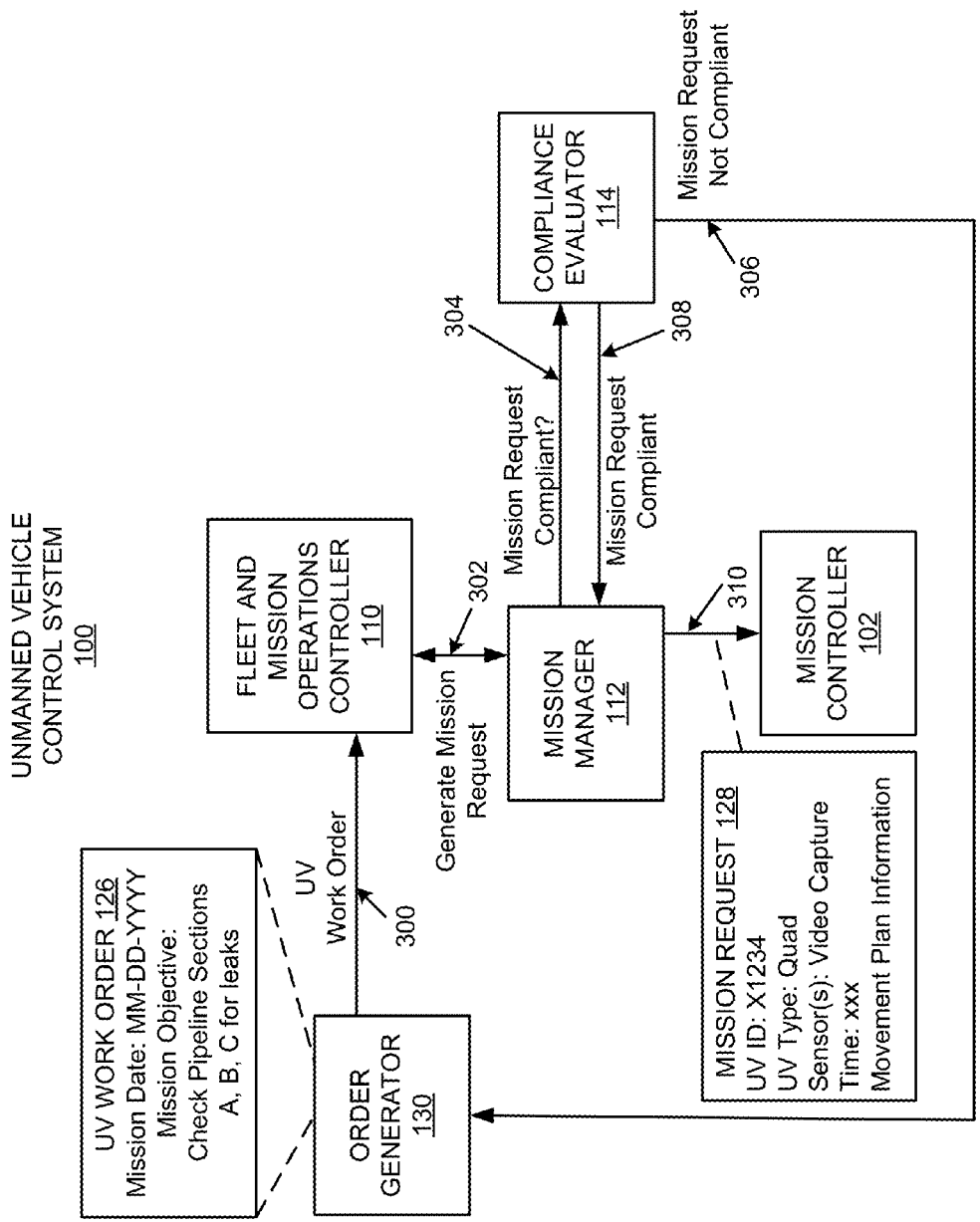

The fleet and mission operations controller 110 may operate in conjunction with the mission manager 112 to convert the UV work order 126 to a mission request 128 (see FIG. 3A). For an aerial UV, the mission request 128 may specify, for example, a flight time, a flight plan, equipment (e.g., the specific UV, sensors, and any UV operation crew). The flight plan may include a launch point, predefined way points, alternate rally points, payload requirements, video or other data gathering requirements, payload operation instructions, and/or mission objectives.

The compliance evaluator 114 may confirm whether the mission request complies with regulations (e.g., government regulations) governing the use of UVs, as well as with other policies related to UVs.

The mission manager 112 may schedule and assign the mission. Specifically the mission manager 112 may assign the UV 104 (or a plurality of UVs), the sensor 106 (or a plurality of sensors), and any UV operation crew to a location for completing the mission request.

The mission controller 102 may receive the mission request from the mission manager 112, and operate the assigned UV 104 according to the movement plan. The UV 104 may follow the movement plan autonomously or with varying degrees of remote operator guidance from the movement planning controller 122 that may be operated by a UV operation crew.

Data from the sensor 106 may be received at the UV data receiver 124, and forwarded (e.g., pushed) in real-time to the event detector 116. Alternatively or additionally, data from the sensor 106 may be communicated directly to the event detector 116 based on the placement of hardware associated with the event detector 116 near the edge of the field (e.g., dashed line 108) or within the field.

The event detector 116 may interpret the data from the sensor 106 in real-time to detect any events or potential problems that warrant further exploration. The event detector 116 may include, for example, event processing, video stream playback, facial recognition, blob detection, and general inspection for the pipeline example described herein. However, those skilled in the art will appreciate in view of this disclosure that the processing capabilities of the event detector 116 may vary depending on the purpose of the mission and the types of sensors that are used for the UV 104.

If an event is detected, the event detector 116 may generate an alert and forward the alert to the fleet and mission operations controller 110. Further, data associated with the event may be displayed in real-time at the fleet and mission operations controller 110. The data associated with the event may be analyzed by the fleet and mission operations controller 110 and the mission manager 112. Based on the analysis of the data, the fleet and mission operations controller 110 may operate in conjunction with the mission manager 112 to communicate to the mission controller 102 a change in movement plan or other further instructions, such as a notification that the mission is complete and an instruction to dismount the sensors from the UV 104 and leave the field.

Figure 2:
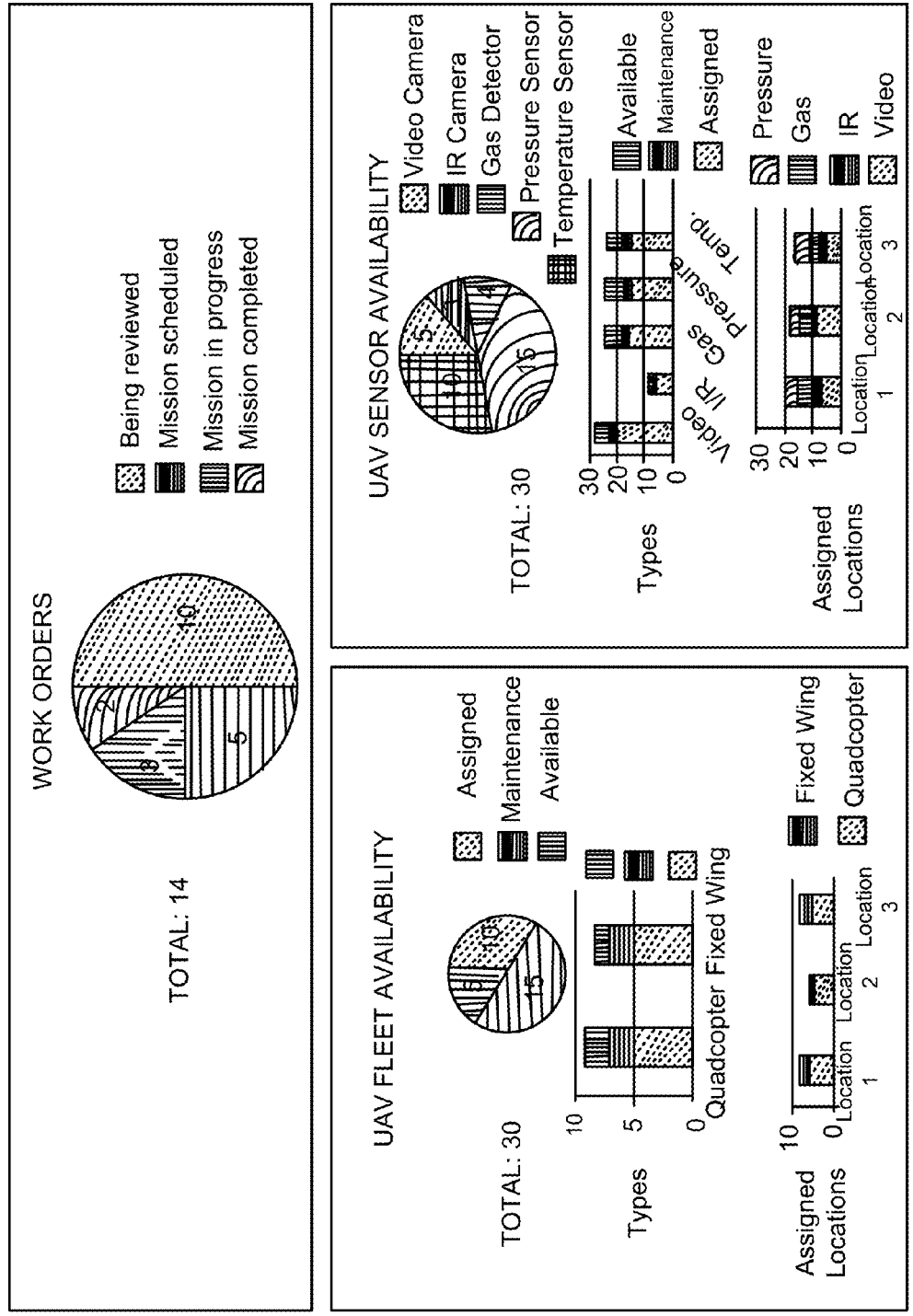
FIG. 2 illustrates a mission console of the UV control system of FIG. 1, according to an example of the present disclosure.

FIG. 2 illustrates a mission console 200 of the UV control system 100, according to an example of the present disclosure. The mission console 200 may be used to display various types of status related to a mission, such as, work order status, and mission status. The mission manager 112 may manage work orders. For example, the mission manager 112 may track a total number of the work orders, as well as a status of each work order, such as under review, scheduled for mission, mission in progress, and mission completed. The mission manager 112 may also track the UVs and sensors in inventory. For example, for each UV 104 and sensor 106, the mission manager 112 may track a status (e.g., available, in maintenance, or assigned), a type (e.g., fixed wing or quadcopter for a vehicle, and pressure, gas, IR, or video for a sensor), and a location. The mission manager 112 may also keep track of which type of UVs each sensor may be used on. For example, IR cameras and their associated gimbals may be mounted on a specific UV. The mission manager 112 may provide for the selection of a particular available UV and available sensors based on mission objectives.

Figure 3B:
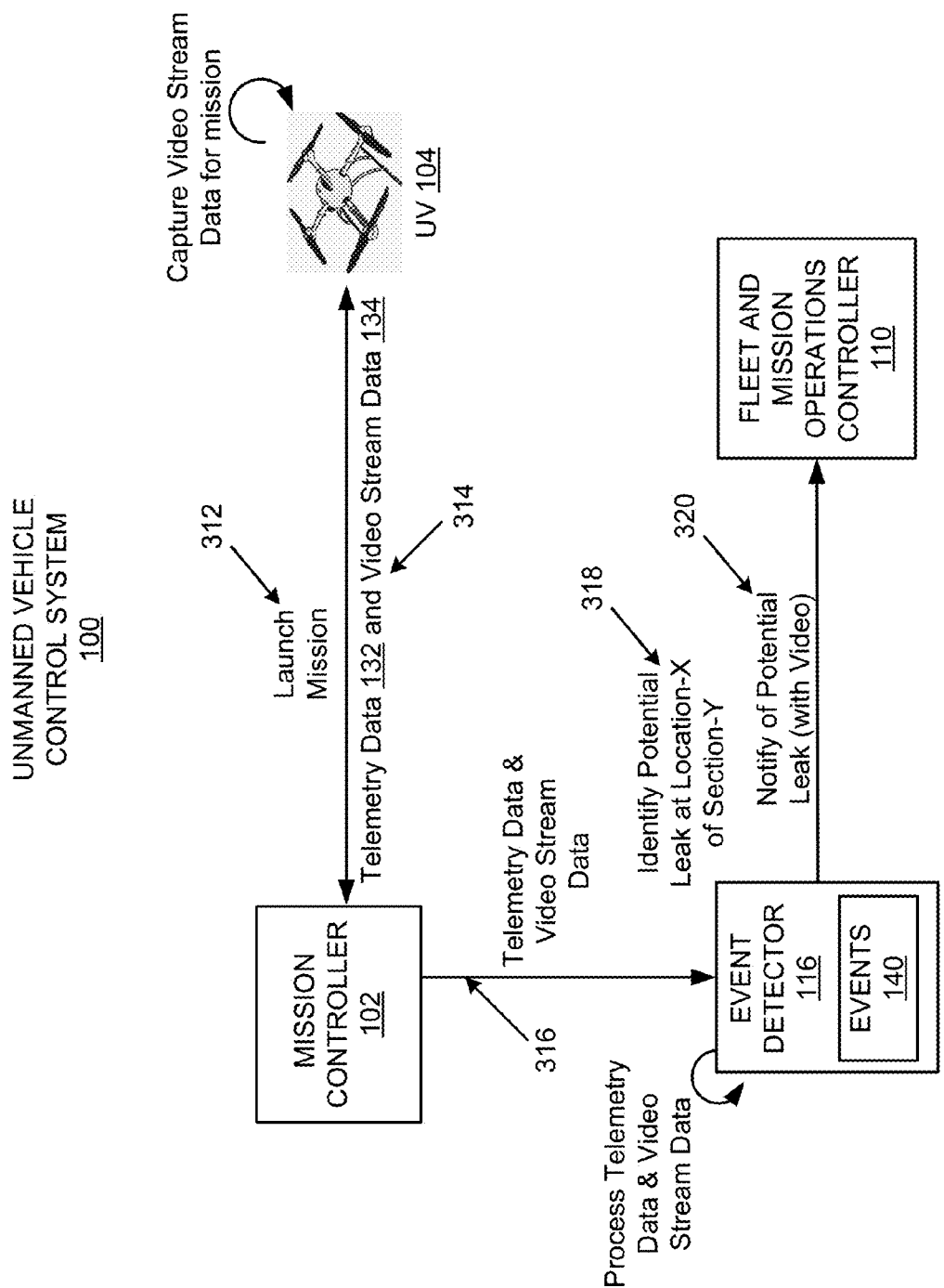

FIGS. 3A-3C illustrate an environment for operation of the UV control system 100, according to an example of the present disclosure.

Referring to FIG. 3A, at 300, a UV work order 126 may be received at the fleet and mission operations controller 110 from the order generator 130. In the example of FIGS. 3A-3C, the UV work order 126 may be related to monitoring of pipeline conditions and other characteristics of interest. The UV work order 126 may include, for example, a mission date, a mission time, and/or a mission objective (e.g., check pipeline sections A, B, and C for leaks). For example, the UV work order 126 may include a request for inspection which states that a potential leak was detected in a certain region of the pipeline and warrants further exploration.

At 302, the fleet and mission operations controller 110 may convert the UV work order 126 to the mission request 128. The mission request 128 may be determined based on a time for a mission, and include aspects related to compliance requirements for the mission, selection of the UV 104 with specified equipment, selection of a mission operator and assistant, identification of an objective for the mission (e.g., to identify a potential leak), and specification of a required movement path. The mission request 128 may be sent to the mission manager 112 for further analysis.

At 304, the mission manager 112 may forward the mission request 128 to the compliance evaluator 114 to determine whether the mission request 128 is in compliance with regulations (e.g., government, or other regulations). For example, the compliance evaluator 114 may determine whether equipment associated with the UV 104 as well as any UV operation crew are in compliance with regulations.

At 306, in response to a determination that the mission request 128 is not in compliance with regulations, the mission request 128 may be returned to the order generator 130, where a modified UV work order 126 may be re-submitted to the fleet and mission operations controller 110.

At 308, in response to a determination that the mission request 128 is in compliance with regulations, at 310, the mission request 128 may be forwarded to the mission controller 102. The mission request 128 may include information such as the UV identification (ID), the UV type, the specific sensor, the time of the mission request, and the movement plan information (e.g., for an aerial UV) which includes the launch point, predefined way points and alternate points, and defines payload requirements (e.g., video camera), payload operation instructions, and mission objectives. At the mission controller 102, the mission planning controller 120 may generate a display of the mission requirements. The mission planning controller 120 may further generate the display of the objectives for the mission, and a movement path for the mission.

Referring to FIGS. 3A and 3B, at 312, the mission controller 102 may launch the mission. With respect to launch of the mission, the mission controller 102 may define the mission movement plan, and operate the UV 104 using movement planning machine readable instructions and ground control. The UV 104 may be operated by a UV operation crew, and/or by the mission controller 102. Further, the mission controller 102 may monitor the real-time movement and display a FPV to ensure the UV 104 completes the movement path and captures data specified in the mission objective. For example, the mission controller 102 may control a camera mounted on the UV 104 for accurate video capture using movement planning machine readable instructions. The FPV may be monitored by a mission operator.

At 314, communication data including telemetry data 132 and video stream data 134 may be received at the mission controller 102 from the UV 104. The telemetry data 132 and the video stream data 134 may include a video feed or other real-time data depending on the mission and data collected.

With respect to the aerial UV 104, as the flight is in progress, at 316, the telemetry data 132 and the video stream data 134 may be forwarded to the event detector 116. The event detector 116 may analyze the telemetry data 132 and the video stream data 134, detect any events 140 related to the UV 104, and notify the fleet and mission operations controller 110 of any problems related to the detected events (e.g., based on alerts). The mission and alerts may be displayed in a real time display at the fleet and mission operations controller 110. For example, with respect to pipeline monitoring, the alerts may be related to an intruder, pipeline maintenance, vegetation, etc. For example, with respect to pipeline monitoring, at 318, the event detector 116 may identify a potential leak at a location-X of a section-Y of a pipeline. Further, at 320, the event detector 116 may generate a notification to the fleet and mission operations controller 110 of the potential leak, and forward an associated video of the leak. The event detector 116 may also generate a notification to the fleet and mission operations controller 110 with respect to any differences between where the leak was detected versus where the leak was actually seen during the mission.

At 322, if deemed appropriate, the fleet and mission operations controller 110 may send instructions to the mission controller 102 to change a movement path while the mission is in progress. Any change to a movement path (or other mission aspects generally) may be re-verified for compliance by the compliance evaluator 114. The mission planning controller 120 may display any adjustment to the movement plan. For example, the movement plan may be modified by directing the UV 104 to a new way point and awaiting instructions to complete the mission. The movement planning controller 122 may be used to complete the mission. For example, processing hardware such as an SD or another type of video card may be loaded to the mission planning controller 120, and upon completion of the mission, the processing hardware associated with the UV 104 may be shipped to an entity associated with the order generator 130 (e.g., the entity for which the UV work order 126 is generated). At the completion of the mission, the UV work order 126 may be processed as being completed, and the mission controller 102 may provide feedback on potential predictive maintenance to the entity associated with the order generator 130.

Upon completion of the mission, the mission manager 112 may document the results of the mission for further processing and analytics. The event detector 116 may also provide recommendations on predictive maintenance for use in future missions. The recommendations may be specified in a report format, which may be used for further preventive actions, such as, shutting off the upstream pipelines to avoid further leakage.

Figure 4:
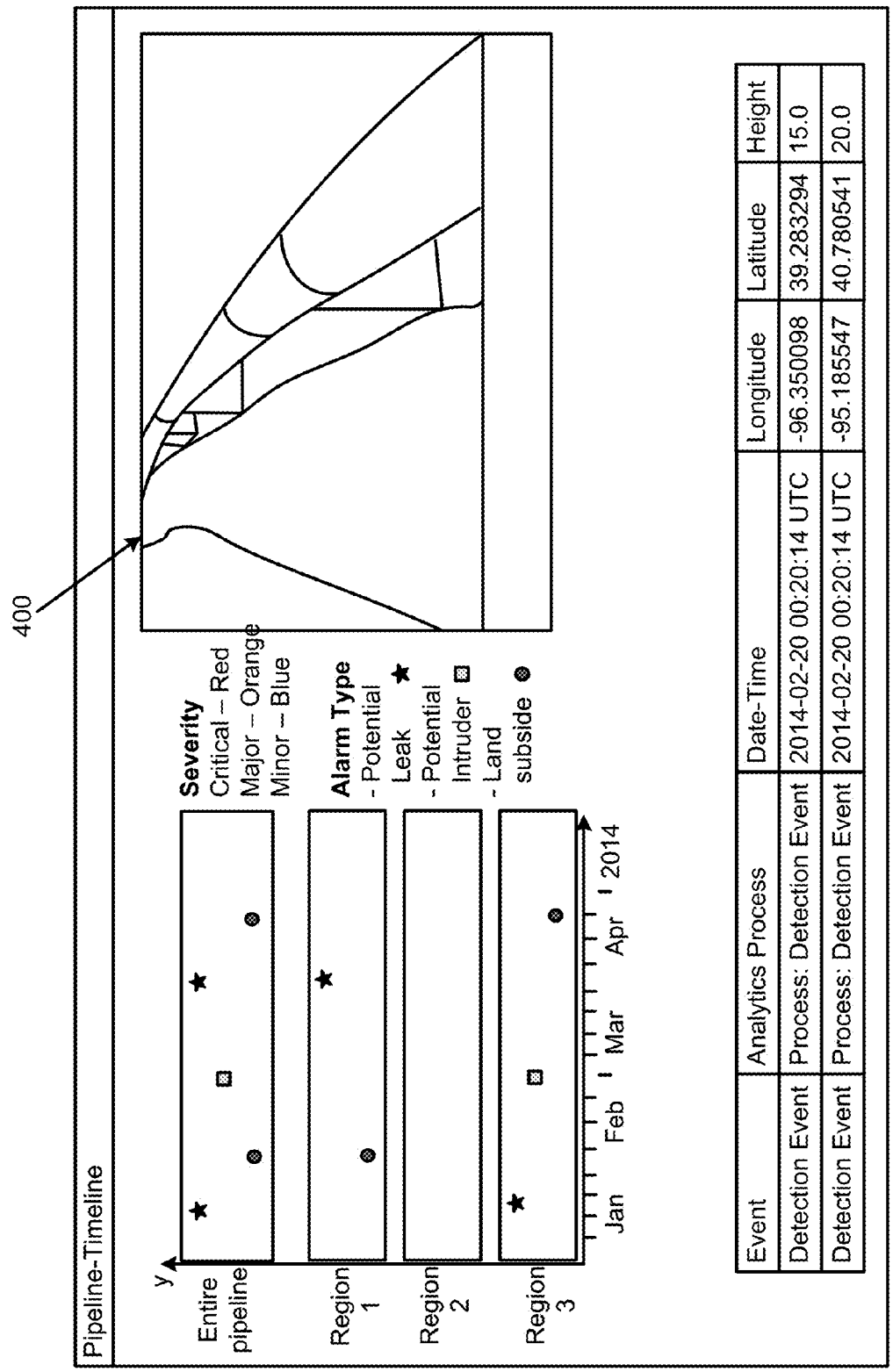
FIG. 4 illustrates an output of an event detector of the UV control system of FIG. 1, according to an example of the present disclosure.

FIG. 4 illustrates an output of an event detector of the UV control system 100, according to an example of the present disclosure. The fleet and mission operations controller 110 may generate a display of different types of events 140 as a function of time. According to an example, with respect to pipeline monitoring, a unique shape may be used to indicate a particular type of event. For example, a potential leak may be represented as a star, a potential intruder may be represented as a square, and a land subside may be represented as a circle. Similarly, color coding may be used to indicate a severity level of an event. For example, a red color may indicate a critical severity, an orange color may indicate a major severity, and a blue color may indicate a minor severity. Any number of techniques may be used to graphically depict events and information relating to the events.

Referring to FIG. 4, the y-axis may be separated into different graphs, each representing subsections of a pipeline, with the subsections being denoted as regions. Within each graph, a location of an event may reflect an overall risk score associated with the event. For example, a relatively high risk score may be represented as a higher location, and a relatively low risk score may be represented as a lower location. The risk score may be based upon the type of risk the problem presents as well as results of the analytics processing.

An event may be selected to generate a further view of a source video (e.g., the source video 400) that caused the event detector 116 to detect and classify the event. According to an example, analytics may be performed on the source video by the event detector 116 and displayed as an analytics processing video. For example, an analytics processing video may include voice over describing the analytics performed on source video. The event detector 116 may generate a notification that is sent to the fleet and mission operations controller 110, where the fleet and mission operations controller 110 may perform actions such as changing the movement plan in real-time to make further observations related to the potential threat. Any change to a movement plan may be re-verified for compliance by the compliance evaluator 114.

Figure 5:
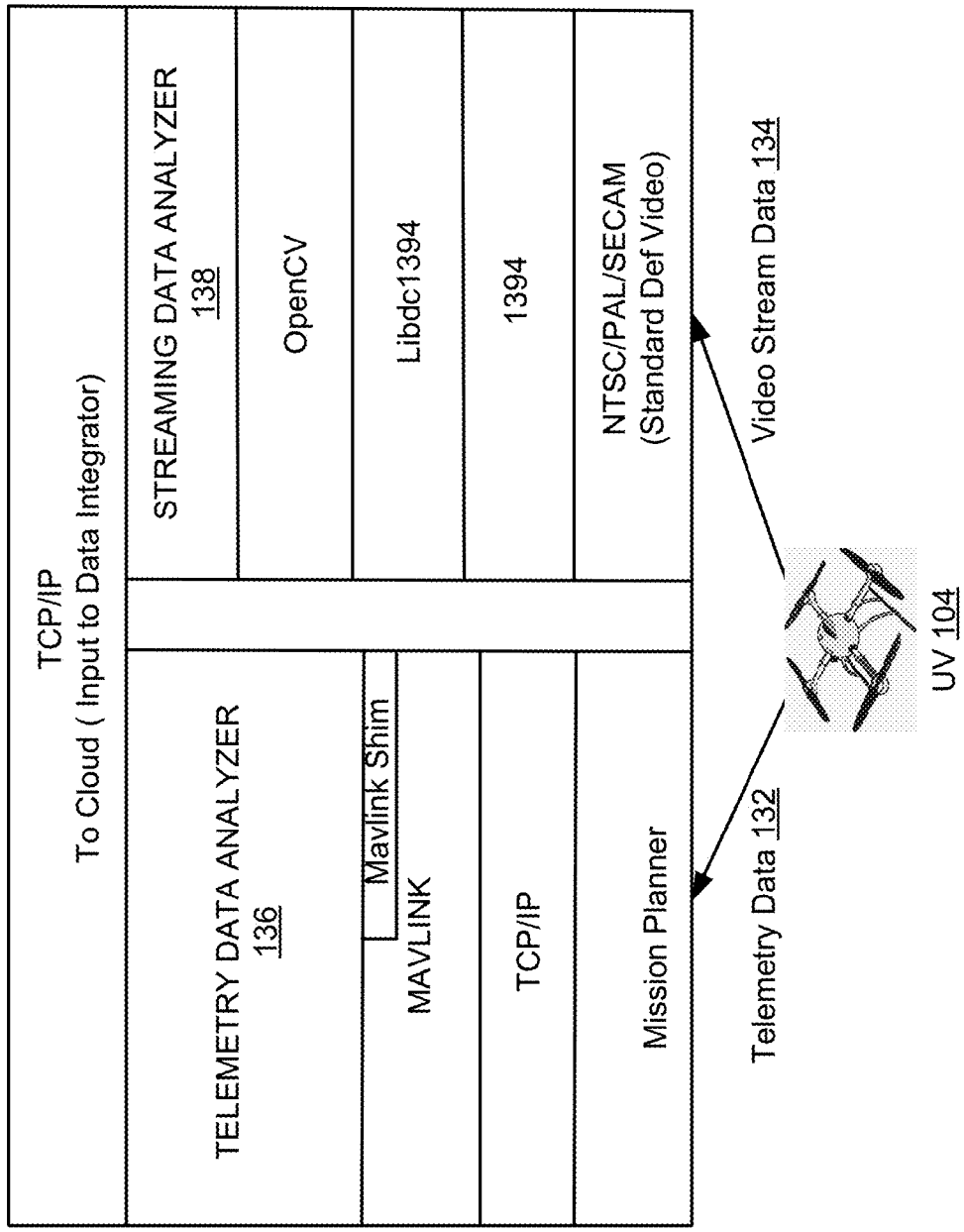
FIG. 5 illustrates an architecture of a mission controller of the UV control system of FIG. 1 for processing data from sensors, according to an example of the present disclosure.

FIG. 5 illustrates architecture of the mission controller 102 for processing data from sensors (e.g., including the sensor 106), according to an example of the present disclosure. As described herein with reference to FIG. 6, the processed data may be transmitted to the event detector 116 for further analysis. Referring to FIG. 5, data from the sensor 106 of the UV 104 may be received at the mission controller 102. For example, telemetry data 132 and video stream data 134 may be received at the mission controller 102. The telemetry data 132 may include information such as a UV location (e.g., to infer latitude, longitude, and height), attitude relative to earth, and an associated time stamp for the location measurement. The telemetry data 132 may be received from the sensor 106 on the UV 104 at the mission planning controller 120 as the UV 104 is operated by the movement planning controller 122. The telemetry data 132 may be processed by a telemetry data analyzer 136 of the UV data receiver 124. Similarly the video stream data 134 may be received, for example, from a camera installed on the UV 104, by the movement planning controller 122, and processed by a streaming data analyzer 138. Various other types of data may be received and pre-processed at the mission controller 102 for the event detector 116.

Referring to FIG. 5, micro air vehicle link (MAVLINK) may represent an open source communications protocol used for telemetry communications between open source ground stations and UV flight controllers (e.g., the mission controller 102). MAVLINK may use a packet based communication that standardizes packets and types for communicating a large number of UV flight control, position, attitude, status, and other relevant data. The MAVLINK shim may be used to interrupt or inject MAVLINK packets into a current communications stream between a personal computer (PC) based ground control station and a UV flight controller. The MAVLINK shim may provide for additional analytics and control machine readable instructions components described herein to send commands over long distance telemetry radios to the UV and vice versa. Further, the MAVLINK shim may operate without interrupting the MAVLINK stream used for communication between a ground station and the UV, and bifurcate off the same information so that the information may be sent via a Transmission Control Protocol/Internet Protocol (TCP/IP) stream to the telemetry data analyzer 136. Open Source Computer Vision (OPENCV) may represent an open source video analytics library used to read images as a video stream from the UV in real-time, and feed the images into the additional analytics components described herein. Libdc1394 & 1394 may represent serial communications libraries used in programming. National Television System Committee (NTSC), Phase Alternating Line (PAL), and Sequential Color with Memory (SECAM) may refer to international standards for video transmission and decoding.

Figure 6:
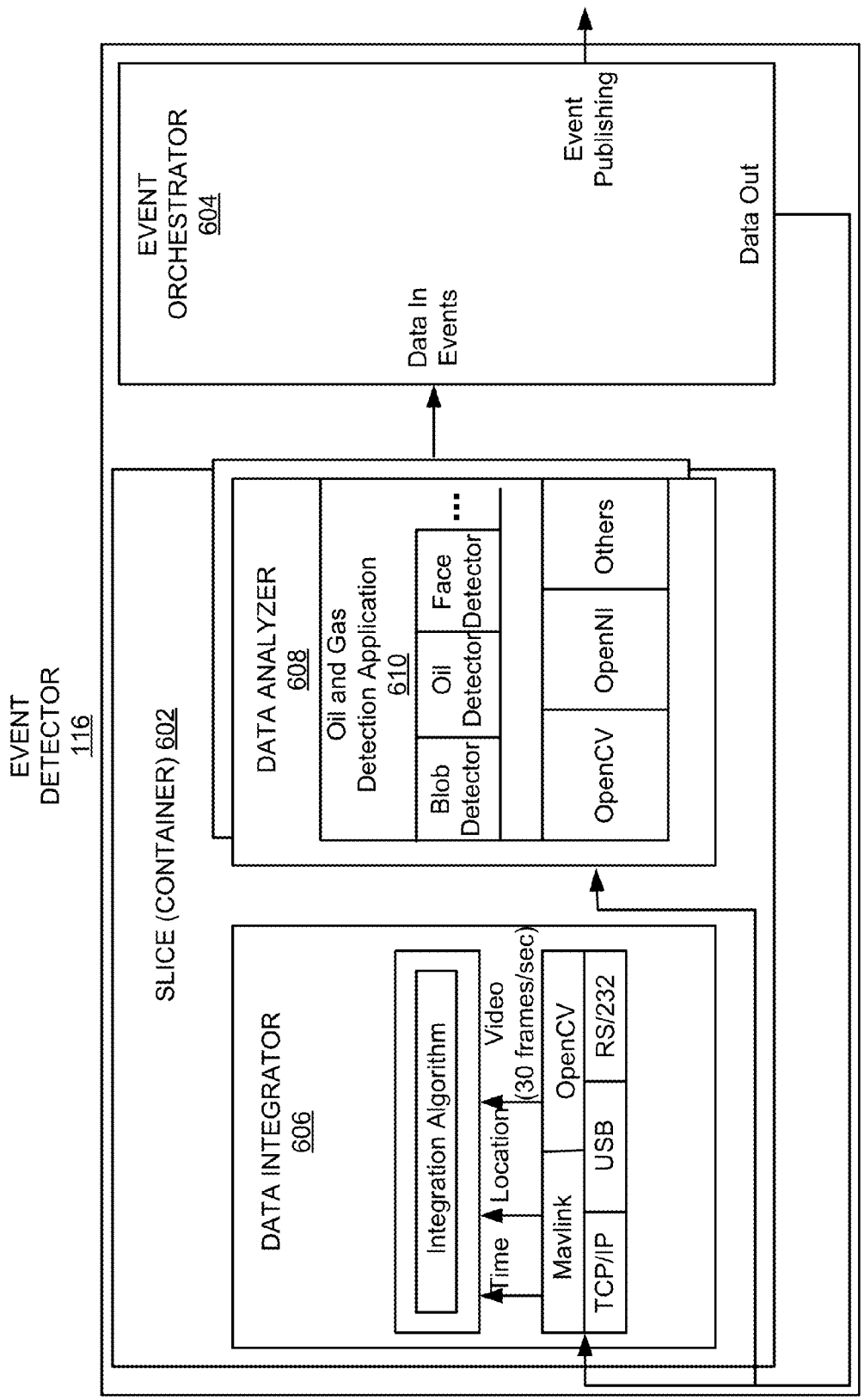
FIG. 6 illustrates an architecture of an event detector of the UV control system of FIG. 1, according to an example of the present disclosure.

Referring to FIG. 6, the event detector 116 may include a slice or container 602 and an event orchestrator 604. The slice 602 may include a hardware implemented data integrator 606 and a hardware implemented data analyzer 608. The data integrator 606 may fuse the various data types received from the sensor 106 through the mission controller 102. For example, the data integrator 606 may combine the video stream data 134 at 30 frames per second with the telemetry data 132 (e.g., time and location) one frame at a time. After exiting the data integrator 606, each frame of video stream data 134 may include time and location information in a meta tag, and is passed to the data analyzer 608. The data analyzer 608 may include various applications (i.e., machine readable instructions) for processing the various types of data for events. For example, with respect to an oil and gas detection application 610, the data analyzer 608 may include a blob detector for detecting oil leaks, vegetation or intruders, an oil detector, a face detector, an event detector, and/or other sub-components for image recognition. The various components such as USB and RS232 represent communications protocols used over serial interfaces, TCP/IP represents the global standard Internet/networking protocol used for computer communications, and the OpenCV and OpenNI components represent open source libraries and machine readable instructions used for development of the data integrator 606.

The detected events may be forwarded to the event orchestrator 604. The event orchestrator 604 may publish the events to the fleet and mission operations controller 110.

Upon the launch of the UV 104 by the movement planning controller 122, a mission planner may initiate a request for a mission session with the event detector 116. An example of a mission planner may include MAVLINK Shim. The mission planning controller 120 may receive the request from the mission planner, and generate a request for the initiation of a session at the event orchestrator 604. Session initiation may include allocation of a data integrator and multiple data analyzers, and connecting the data integrator and the data analyzers to a receiver for data capture. The event orchestrator 604 may receive the events and publish the events for use at a dashboard for the mission controller 102.

Figure 7:
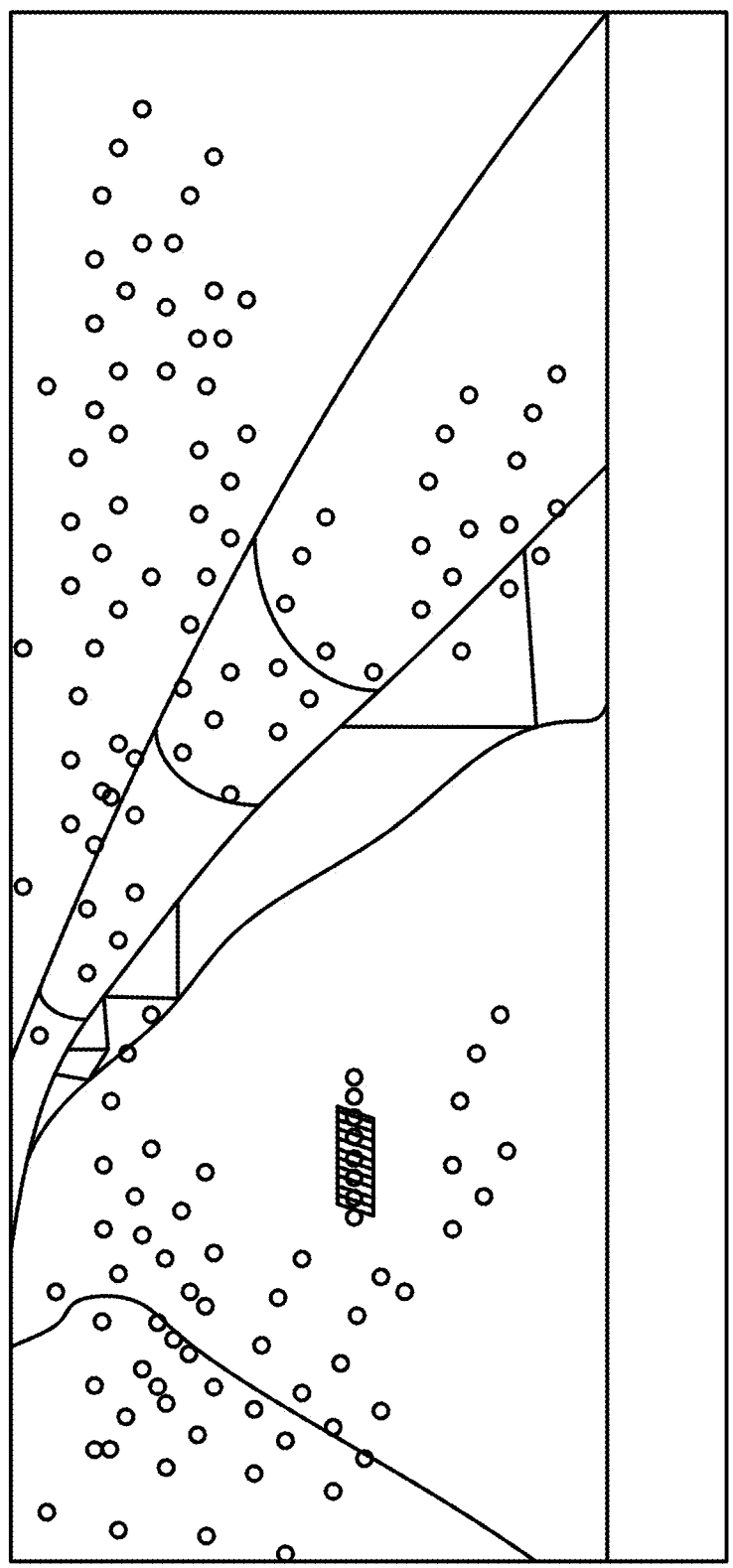
FIG. 7 illustrates a screenshot of an event detection analytics processing video of the UV control system of FIG. 1, according to an example of the present disclosure.
Figure 8:
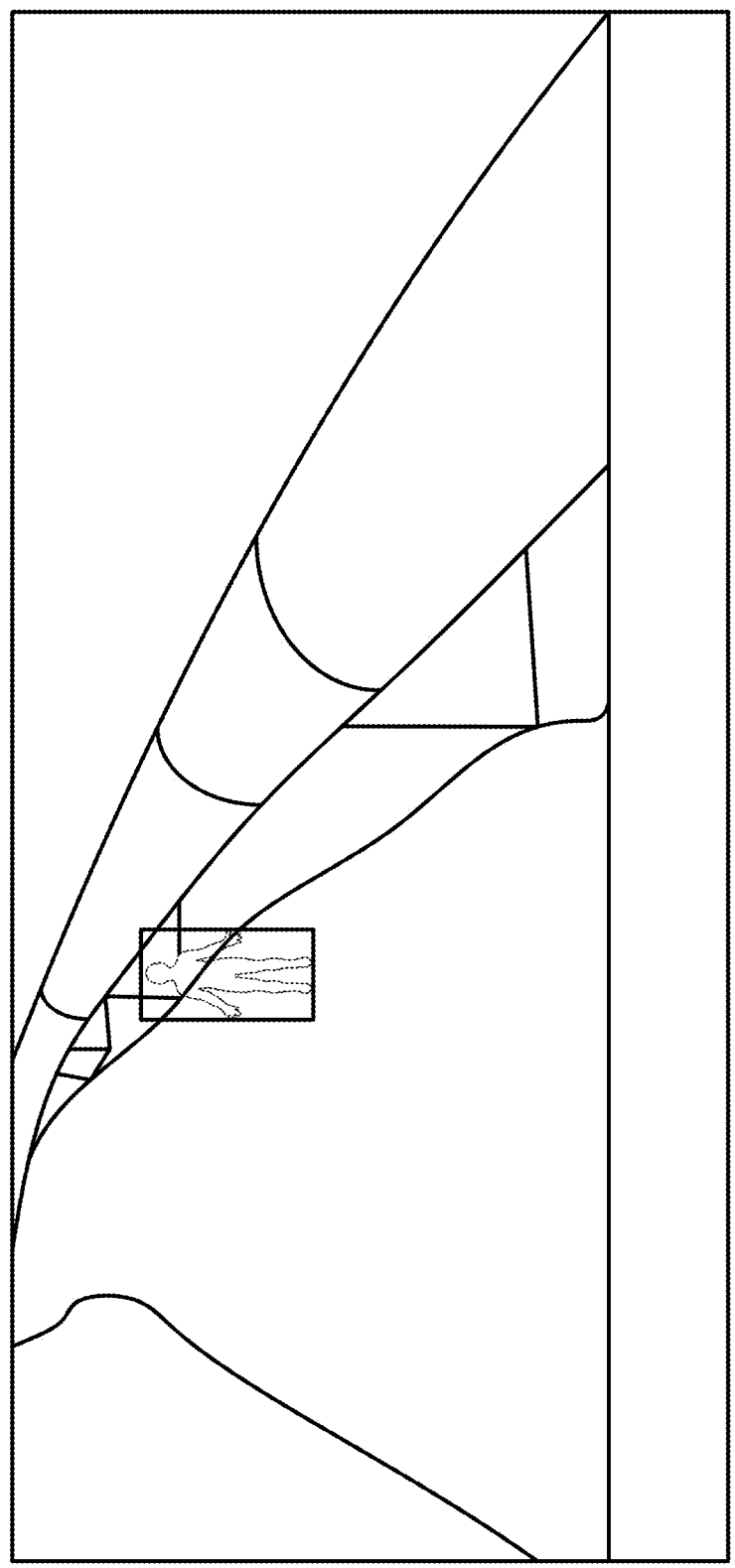
FIG. 8 illustrates a screenshot of an event detection analytics processing video of the UV control system of FIG. 1, according to an example of the present disclosure.

FIGS. 7 and 8 illustrate screenshots of event detection analytics processing videos of the UV control system 100, according to an example of the present disclosure. Referring to FIG. 7, the event detection analytics processing video may represent a spill or blob detection analytics processing video. Similarly, referring to FIG. 8, the event detection analytics processing video may represent an intruder detection analytics processing video.

Referring to FIGS. 5-7, with respect to the oil and gas detection application 610, spill or blob detection analytics may include converting source video frame (and its pixels), for example, from red, green, and blue (RGB) into its corresponding hue-saturation-values (HSVs) to adjust for variations in lighting conditions and shadows. The data analyzer 608 may define lower and upper bounds of the HSVs depending on the type of material and the time of the day so that pixels with the correct HSV may be extracted. The data analyzer 608 may analyze each video frame, apply a binary mask (e.g., accepted pixels are black, others are white) to extract portions of the frame that fit within the defined HSV requirements. By using, for example, a built-in blob detection library, the data analyzer 608 may extract the positions of all of the blobs in the binary mask, and use these positions to overlay as circles on top of the original video (see FIG. 7). Simultaneously, parameter constraints may be placed on the extracted blobs and include, for example, area, perimeter, circularity, max_x, and max_y. The max_x and max_y may represent the maximum distance from the pipeline used for consideration based on the assumption that the spill should not be too far away from the pipeline. Once a blob fits the above requirements with a high degree of confidence, the data analyzer 608 may classify the blob as a potential spill, and forward the indication to the event orchestrator 604. For example, in FIG. 7, a grate may be classified as a potential spill.

Referring to FIGS. 5, 6, and 8, the oil and gas detection application 610 may include intruder analytics that include detection and recognition. With respect to detection, depending on the type of objects being detected and/or tracked, different cascading classifiers may be used. Cascading classifiers may represent a concatenation of a plurality of classifiers to test for different features that factor into a single detection problem. An object may be considered as detected if it passes all the classifiers within the cascade (i.e., by using a cascade-of-rejectors approach). The classifiers may be trained using a large set of training data at various angles, or at an expected angle appropriate to the UV 104 (e.g., an angle that is equivalent to an above eye level). Examples of cascading classifiers that are used for face and person detection may respectively include the HAAR cascade and the histograms of oriented gradients (HOG) cascade, and other such techniques. The HOG cascade may use a dense grid of HOGs that are determined over blocks of pixels to represent a detection window. The HOG cascade technique may include a speed limitation depending on the sparse scanning technique and how many windows may be analyzed per frame per second. These detection windows may represent the functional units used to learn features. The actual feature selection process may be performed, for example, by the Adaptive Boosting technique, or other such techniques.

With respect to facial recognition, examples of techniques may include the FISHERFACES technique, Linear Discriminant Analysis (LDA), or other such techniques. The FISHERFACES technique may be used for dimensionality reduction and classification. A set of training data may be fed to perform cross principal component analysis (PCA) with the detected features (e.g., face, person, eyes, etc.).

With respect to intruder detection, intruder detection may include using the HOG cascading classifier for person detection, setting the max and min acceptable area of the desired object, gray scaling each video frame for faster motion detection, applying, for example, a KALMAN filter to consistently take in series of measurements of detected persons (e.g., width, height, positions etc. stored within a standard vector), and filtering out those entries with measurements that are not consistent with past entries. For example, the probability of a person's position transitioning to the next position decreases exponentially with differences in the two positions being above a threshold that would be unreasonable for the person to travel in a specified period of time. Intruder detection may also account for a dimension change over measurements. For example, as a person is walking towards a camera of the UV 104, the dimensions of the person should increase proportionally, and outlying measurements may be eliminated.

The elements of the UV control system 100 described herein may be machine readable instructions stored on a non-transitory computer readable medium. In addition, or alternatively, the elements of the UV control system 100 may be hardware or a combination of machine readable instructions and hardware.

Figure 9:
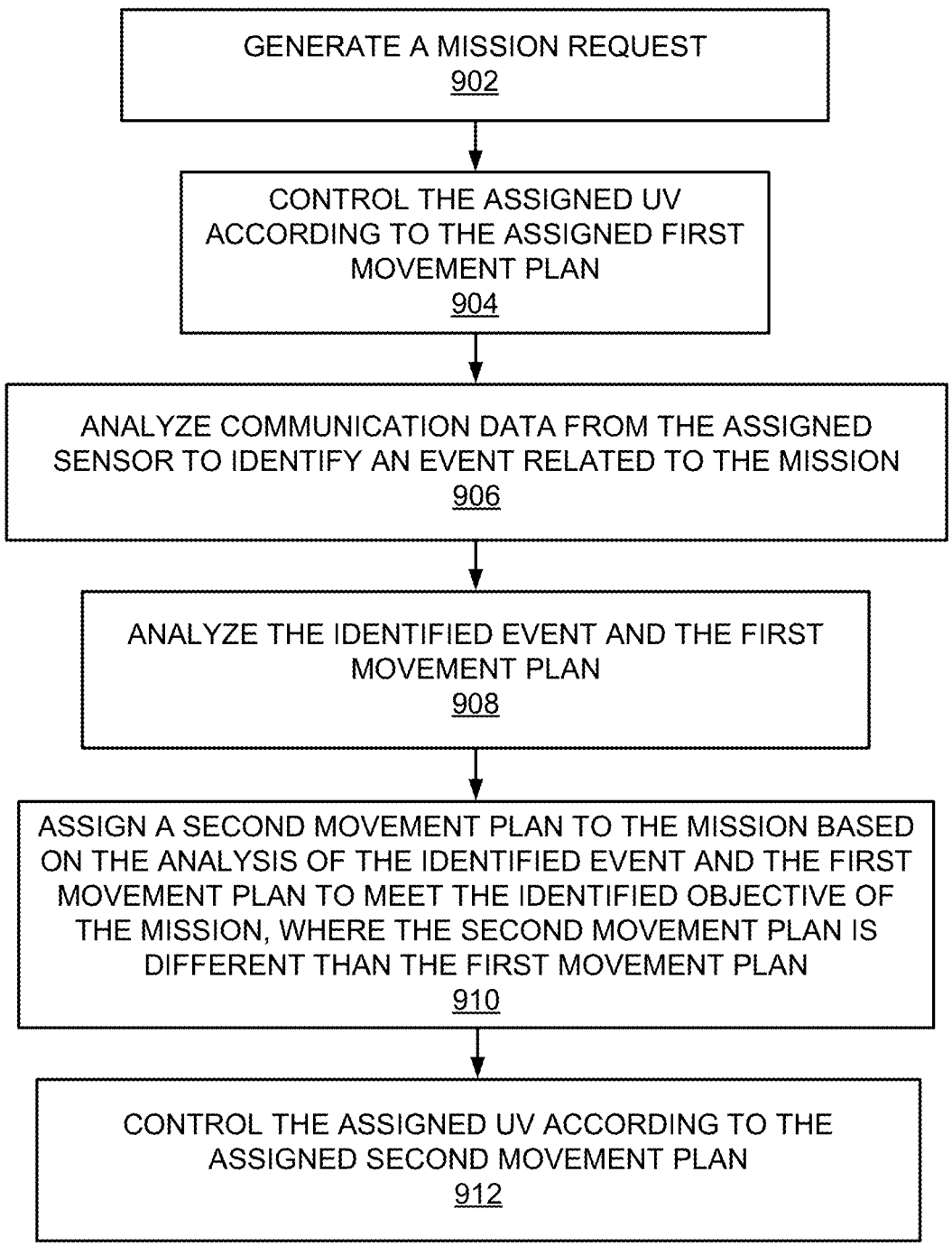
FIG. 9 illustrates a method for UV control, according to an example of the present disclosure.
Figure 10:
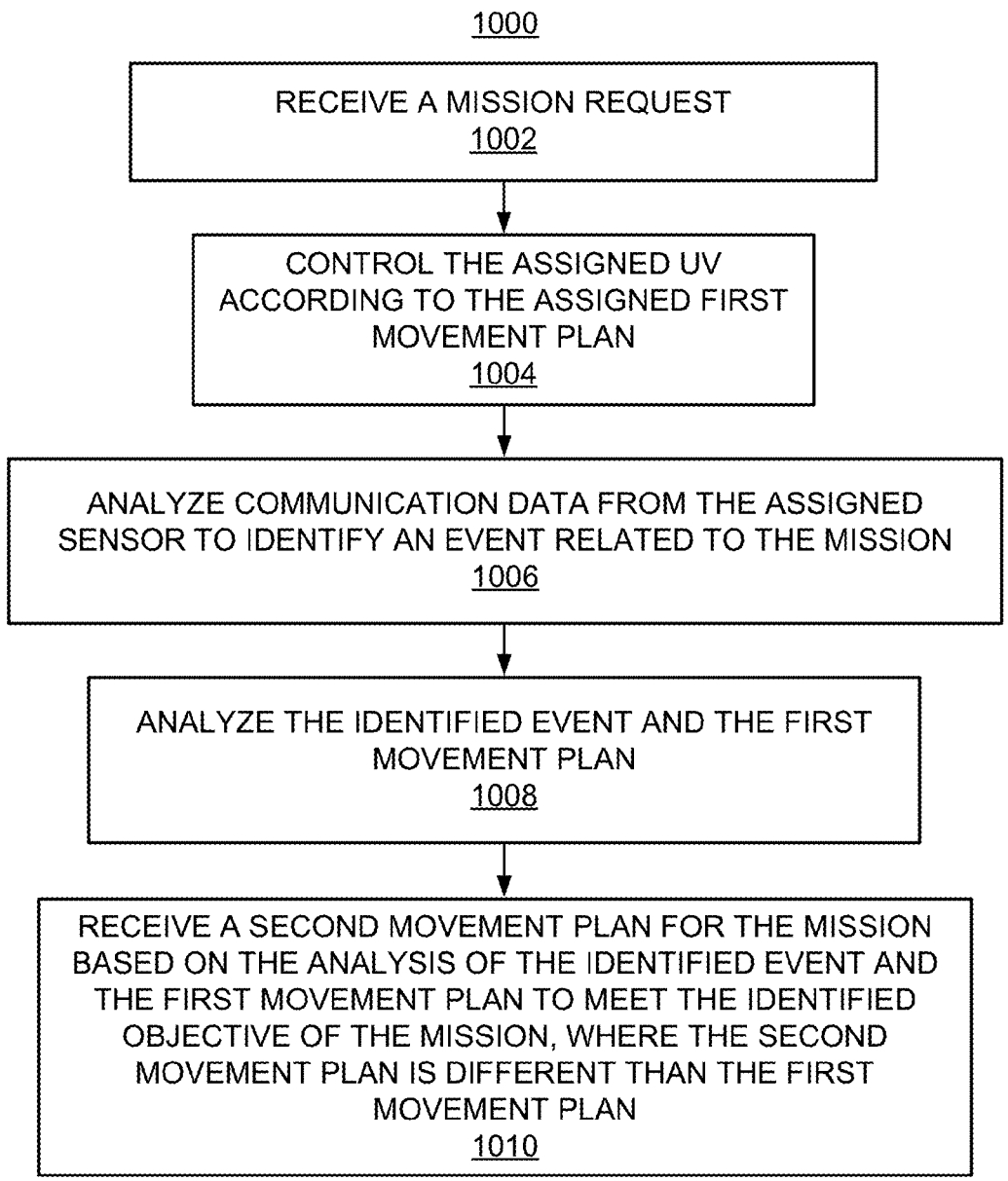
FIG. 10 illustrates further details of the method for UV control, according to an example of the present disclosure.

FIGS. 9 and 10 illustrate flowcharts of methods 900 and 1000 for UV control, according to examples. The methods 900 and 1000 may be implemented on the UV control system 100 described above with reference to FIGS. 1-8 by way of example and not limitation. The methods 900 and 1000 may be practiced in other systems.

Referring to FIGS. 1 and 9, at block 902, the method 900 may include generating, by a hardware implemented fleet and mission operations controller that is executed by at least one hardware processor, a mission request to identify an objective of a mission, assign a UV and a sensor to the mission from a fleet of UVs and sensors, and assign a first movement plan to the mission based on the identified objective of the mission. For example, referring to FIGS. 1, 3A-3C, and 11, the hardware implemented fleet and mission operations controller 110 that is executed by at least one hardware processor (e.g., the hardware processor 1102), may generate the mission request 128 to identify an objective of a mission, assign a UV 104 and a sensor 106 to the mission from a fleet of UVs and sensors, and assign a first movement plan to the mission based on the identified objective of the mission.

At block 904, the method 900 may include controlling, by a hardware implemented mission controller that is executed by the at least one hardware processor, the assigned UV according to the assigned first movement plan. For example, referring to FIGS. 1, 3A-3C, and 11, the hardware implemented mission controller 102 that is executed by the at least one hardware processor may control the assigned UV according to the assigned first movement plan.

At block 906, the method 900 may include analyzing, by a hardware implemented event detector that is executed by the at least one hardware processor, communication data from the assigned sensor to identify an event related to the mission. For example, referring to FIGS. 1, 3A-3C, and 11, the hardware implemented event detector 116 that is executed by the at least one hardware processor may analyze communication data (e.g., the telemetry data 132 and the video stream data 134) from the assigned sensor to identify an event (e.g., one of the events 140) related to the mission.

At block 908, the method 900 may include analyzing, by the hardware implemented fleet and mission operations controller, the identified event and the first movement plan. For example, referring to FIGS. 1, 3A-3C, and 11, the hardware implemented fleet and mission operations controller 110 may analyze the identified event and the first movement plan.

At block 910, the method 900 may include assigning, by the hardware implemented fleet and mission operations controller, a second movement plan to the mission based on the analysis of the identified event and the first movement plan to meet the identified objective of the mission, where the second movement plan is different than the first movement plan. For example, referring to FIGS. 1, 3A-3C, and 11, the hardware implemented fleet and mission operations controller 110 may assign a second movement plan to the mission based on the analysis of the identified event and the first movement plan to meet the identified objective of the mission, where the second movement plan is different than the first movement plan.

At block 912, the method 900 may include controlling, by the hardware implemented mission controller, the assigned UV according to the assigned second movement plan. For example, referring to FIGS. 1, 3A-3C, and 11, the hardware implemented mission controller 102 may control the assigned UV according to the assigned second movement plan.

Referring to FIGS. 1 and 10, at block 1002, the method 1000 may include receiving, at a hardware implemented mission controller that is executed by the at least one hardware processor, a mission request that identifies an objective of a mission, assigns a UV and a sensor to the mission from a fleet of UVs and sensors, and assigns a first movement plan to the mission based on the identified objective of the mission. For example, referring to FIGS. 1, 3A-3C, and 11, the hardware implemented mission controller 102 may receive the mission request 128 that identifies an objective of a mission, assigns the UV 104 and the sensor 106 to the mission from a fleet of UVs and sensors, and assigns a first movement plan to the mission based on the identified objective of the mission.

At block 1004, the method 1000 may include controlling, by the hardware implemented mission controller, the assigned UV according to the assigned first movement plan. For example, referring to FIGS. 1, 3A-3C, and 11, the hardware implemented mission controller 102 may control the assigned UV according to the assigned first movement plan.

At block 1006, the method 1000 may include analyzing, by a hardware implemented event detector that is executed by the at least one hardware processor, communication data from the assigned sensor to identify an event related to the mission. For example, referring to FIGS. 1, 3A-3C, and 11, the hardware implemented event detector 116 may analyze communication data from the assigned sensor to identify an event related to the mission.

At block 1008, the method 1000 may include analyzing, by a hardware implemented fleet and mission operations controller, the identified event and the first movement plan. For example, referring to FIGS. 1, 3A-3C, and 11, the hardware implemented fleet and mission operations controller 110 may analyze the identified event and the first movement plan.

At block 1010, the method 1000 may include receiving, at the hardware implemented mission controller, a second movement plan for the mission based on the analysis of the identified event and the first movement plan to meet the identified objective of the mission, where the second movement plan is different than the first movement plan. For example, referring to FIGS. 1, 3A-3C, and 11, the hardware implemented mission controller 102 may receive a second movement plan for the mission based on the analysis of the identified event and the first movement plan to meet the identified objective of the mission, where the second movement plan is different than the first movement plan.

Figure 11:
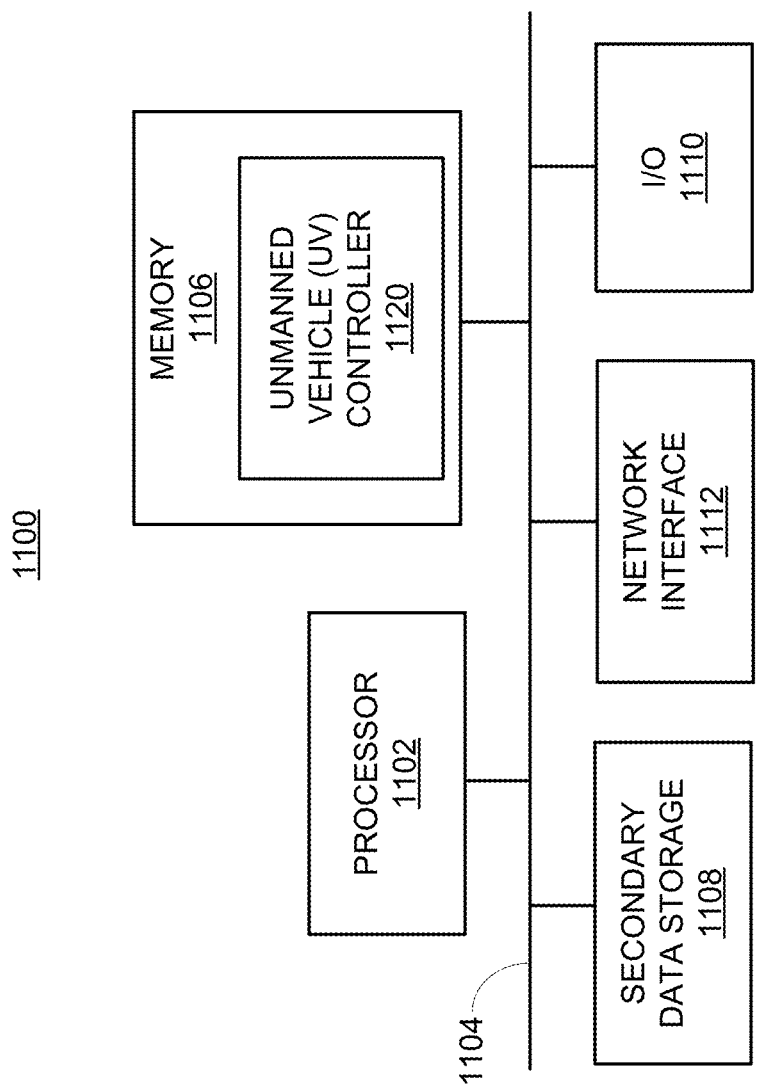
FIG. 11 illustrates a computer system, according to an example of the present disclosure.

FIG. 11 shows a computer system 1100 that may be used with the examples described herein. The computer system may represent a generic platform that includes components that may be in a server or another computer system. The computer system 1100 may be used as a platform for the system 100. The computer system 1100 may execute, by a processor (e.g., a single or multiple processors) or other hardware processing circuit, the methods, functions and other processes described herein. These methods, functions and other processes may be embodied as machine readable instructions stored on a computer readable medium, which may be non-transitory, such as hardware storage devices (e.g., RAM (random access memory), ROM (read only memory), EPROM (erasable, programmable ROM), EEPROM (electrically erasable, programmable ROM), hard drives, and flash memory).

The computer system 1100 may include a processor 1102 that may implement or execute machine readable instructions performing some or all of the methods, functions and other processes described herein. Commands and data from the processor 1102 may be communicated over a communication bus 1104. The computer system may also include a main memory 1106, such as a random access memory (RAM), where the machine readable instructions and data for the processor 1102 may reside during runtime, and a secondary data storage 1108, which may be non-volatile and stores machine readable instructions and data. The memory and data storage are examples of computer readable mediums. The memory 1106 may include a UV controller 1120 including machine readable instructions residing in the memory 1106 during runtime and executed by the processor 1102. The UV controller 1120 may include the elements of the system 100 shown in FIG. 1.

The computer system 1100 may include an I/O device 1110, such as a keyboard, a mouse, a display, etc. The computer system may include a network interface 1112 for connecting to a network. Other known electronic components may be added or substituted in the computer system.

What has been described and illustrated herein is an example along with some of its variations. The terms, descriptions and figures used herein are set forth by way of illustration only and are not meant as limitations. Many variations are possible within the spirit and scope of the subject matter, which is intended to be defined by the following claims—and their equivalents—in which all terms are meant in their broadest reasonable sense unless otherwise indicated.

What is claimed is:

1. An unmanned vehicle (UV) control system comprising:
   a fleet and mission operations controller, executed by at least one hardware processor, to receive a UV work order and to generate a mission request based on the UV work order, the mission request identifying an objective of a mission, assigning a UV and a sensor to the mission from a fleet of UVs and sensors, and assigning a first movement plan to the mission based on the identified objective of the mission;
   a mission controller, executed by the at least one hardware processor, to
      control the assigned UV according to the assigned first movement plan, and
      receive communication data from the assigned sensor, wherein the communication data includes telemetry data and video stream data; and
   an event detector, executed by the at least one hardware processor, to
      receive the communication data that includes the telemetry data and the video stream data,
      combine the telemetry data and the video stream data,
      analyze the combined telemetry data and the video stream data to identify an event related to the mission, and
      forward the identified event to the fleet and mission operations controller to
         analyze the identified event and the first movement plan, and
         assign a second movement plan to the mission based on the analysis of the identified event and the first movement plan to meet the identified objective of the mission, wherein the second movement plan is different than the first movement plan,
   wherein the mission controller is to control the assigned UV according to the assigned second movement plan, and
   wherein the fleet and mission operations controller and the event detector are hosted in an off-site facility relative to the assigned UV.

2. The UV control system according to claim 1, further comprising:
   a compliance evaluator, executed by the at least one hardware processor, to
      determine whether the mission request is compliant with at least one of regulations and safety parameters, and
      in response to a determination that the mission request is compliant with the at least one of regulations and safety parameters, forward the mission request to the mission controller.

3. The UV control system according to claim 1, further comprising:
   a compliance evaluator, executed by the at least one hardware processor, to
      determine whether the assigned UV and a UV operation crew associated with the mission request is compliant with at least one of regulations and safety parameters, and
      in response to a determination that the assigned UV and the UV operation crew associated with the mission request is compliant with the at least one of regulations and safety parameters, forward the mission request to the mission controller.

4. The UV control system according to claim 1, wherein the fleet of UVs includes unmanned aerial vehicles (UAVs).

5. The UV control system according to claim 1, wherein the sensors include video cameras, gas detectors, infrared (IR) cameras, and pressure sensors.

6. The UV control system according to claim 1, wherein
   the first movement plan includes predefined way points and alternate points for the UV based on the identified objective of the mission, and
   the second movement plan includes at least one different predefined way point from the predefined way points and at least one different alternate point from the alternate points for the UV based on the analysis of the identified event to meet the identified objective of the mission.

7. The UV control system according to claim 1, wherein
   the sensor includes a video camera, and
   the mission controller is to
      generate a real-time display from the video camera,
      receive instructions to modify movement of the UV based on an analysis of the real-time display from the video camera, and
      modify movement of the UV based on the received instructions.

8. The UV control system according to claim 1, wherein the UV is an autonomous UV.

9. The UV control system according to claim 1, wherein the event detector is to analyze the communication data to identify the event that includes a potential leak or an intruder related to a pipeline.

10. The UV control system according to claim 1, wherein the event detector is to
   analyze the communication data to identify the event related to a pipeline, and generate instructions for preventative actions with respect to the pipeline based on the identification of the event.

11. The UV control system according to claim 1, wherein the mission controller is to
analyze the event to determine a severity level of the event, and
generate a real-time display related to the event, wherein the real-time display includes a characterization of a type and the severity level of the event.

12. The UV control system according to claim 1, wherein the event detector is to combine the telemetry data and the video stream data by
determining a number of frames per second for the video stream data,
determining, from the telemetry data, a time and a location associated with the video stream data, and
generating a meta tag for each of the frames of the video stream data, wherein the meta tag includes the time and the location associated with the video stream data.

13. The UV control system according to claim 1, wherein the event detector is to analyze the communication data to identify the event that includes a potential leak by
converting the video stream data from red, green, and blue (RGB) into corresponding hue-saturation-values (HSVs) to adjust for variations in lighting conditions and shadows,
defining lower and upper bounds of the HSVs based on a type of material associated with the potential leak,
analyzing, based on the defined lower and upper bounds, each video frame associated with the video stream data to overlay shapes on each of the video frames associated with the video stream data, and
applying parameter constraints to determine whether an area of a video frame associated with the overlayed shapes represents the potential leak.

14. A method for unmanned vehicle (UV) control, the method comprising:
generating, by a fleet and mission operations controller that is executed by at least one hardware processor, a mission request to
identify an objective of a mission,
assign a UV and a sensor to the mission from a fleet of UVs and sensors, and
assign a first movement plan to the mission based on the identified objective of the mission;
controlling, by a mission controller that is executed by the at least one hardware processor, the assigned UV according to the assigned first movement plan;
receiving, by an event detector that is executed by the at least one hardware processor, communication data that includes telemetry data and video stream data;
analyzing, by the event detector, the communication data from the assigned sensor by combining the telemetry data and the video stream data to identify an event related to the mission;
analyzing, by the fleet and mission operations controller, the identified event and the first movement plan;
assigning, by the fleet and mission operations controller, a second movement plan to the mission based on the analysis of the identified event and the first movement plan to meet the identified objective of the mission, wherein the second movement plan is different than the first movement plan; and
controlling, by the mission controller, the assigned UV according to the assigned second movement plan.

15. The method for UV control according to claim 14, wherein analyzing, by the event detector that is executed by the at least one hardware processor, the communication data from the assigned sensor by combining the telemetry data and the video stream data to identify the event related to the mission further comprises:
analyzing, by the event detector, the communication data to identify the event that includes a potential leak or an intruder related to a pipeline.

16. The method for UV control according to claim 14, further comprising:
determining, by a compliance evaluator that is executed by the at least one hardware processor, whether the mission request is compliant with regulations, and
in response to a determination that the mission request is compliant with regulations, forwarding, from the compliance evaluator, the mission request to the mission controller.

17. The method for UV control according to claim 14, further comprising:
generating, by the mission controller, a real-time display related to the event, wherein the real-time display includes a characterization of a type and a severity level of the event.

18. The method for UV control according to claim 14, further comprising:
analyzing, by the event detector, the communication data to identify the event related to a pipeline, and
generating, by the event detector, instructions for preventative actions with respect to the pipeline based on the identification of the event.

19. The method for UV control according to claim 14, wherein the sensor includes a video camera, the method further comprises:
generating, by the mission controller, a real-time display from the video camera,
receiving, by the mission controller, instructions to modify movement of the UV based on an analysis of the real-time display from the video camera, and
modifying, by the mission controller, movement of the UV based on the received instructions.

20. A non-transitory computer readable medium having stored thereon machine readable instructions for UV control, the machine readable instructions when executed cause at least one hardware processor to:
receive, at a mission controller that is executed by the at least one hardware processor, a mission request that
identifies an objective of a mission,
assigns a UV and a sensor to the mission from a fleet of UVs and sensors, and
assigns a first movement plan to the mission based on the identified objective of the mission;
control, by the mission controller, the assigned UV according to the assigned first movement plan;
receive, by an event detector that is executed by the at least one hardware processor, communication data that includes telemetry data and video stream data;
analyze, by the event detector that is executed by the at least one hardware processor, the communication data from the assigned sensor by combining the telemetry data and the video stream data to identify an event related to the mission;
analyze, by a fleet and mission operations controller, the identified event and the first movement plan; and
receive, at the mission controller, a second movement plan for the mission based on the analysis of the identified event and the first movement plan to meet the identified objective of the mission, wherein the second movement plan is different than the first movement plan.

* * * * *